United States Patent [19]

Jelinek

[11] Patent Number: 5,327,145
[45] Date of Patent: Jul. 5, 1994

[54] TIME DELAY PASSIVE RANGING TECHNIQUE

[75] Inventor: Carl O. Jelinek, Tustin, Calif.

[73] Assignee: Hughes Aircraft Company, Los Angeles, Calif.

[21] Appl. No.: 526,924

[22] Filed: May 22, 1990

[51] Int. Cl.⁵ .......................... G01S 3/04; G01S 5/10
[52] U.S. Cl. ........................ 342/453; 342/13;
   342/146; 342/126; 342/451; 342/458
[58] Field of Search ............... 342/13, 453, 146, 123,
   342/125, 126, 451, 458

[56] References Cited

U.S. PATENT DOCUMENTS

| | | | |
|---|---|---|---|
| 3,789,409 | 1/1974 | Easton | 342/357 |
| 3,875,570 | 4/1975 | Litchford | 342/32 |
| 3,895,382 | 7/1975 | Litchford | 342/32 |
| 3,939,476 | 2/1976 | Leopard et al. | 342/464 |
| 4,642,648 | 2/1987 | Hulland et al. | 342/455 |
| 4,954,837 | 9/1990 | Baird et al. | 342/458 |

*Primary Examiner*—John B. Sotomayor
*Attorney, Agent, or Firm*—Wanda K. Denson-Low

[57] ABSTRACT

A method of passive ranging and geolocation of multiple emitters by a single detection platform. Two independent emission sequences support formulation of two independent algebraic equations involving a triangular arrangement of platform and emitters. One sequence constitutes an interrogation signal by one emitter and a transponded or reflected signal from another. A second emission sequence constitutes the reversed order of emitters from those of the first emission sequence. The method utilizes the steps of measuring the time difference of arrival at the platform of signals having travelled the direct path and the transponded or reflected paths, and measuring the angles of arrival of received signals for each independent emission sequence. A series of steps computing ranges and angles based on prior measurements provide a set of desired ranges and angles identifying the relative positions of the emitters relative to the platform. The invention may be employed in bistatic or transponded mode depending on the kind of signal emissions that are to be exploited. In the bistatic mode, the energy from an emitter is reflected from the other emitter. In the transponder mode the emitters communicate in an interrogation-transpond format with signals with known and small internal time delays. In the transponder mode, both signals are direct path signals.

19 Claims, 1 Drawing Sheet

TIME DELAY PASSIVE RANGING TECHNIQUE

BACKGROUND

The present invention relates to target location, and more particularly, to a passive method of locating targets.

In electronic warfare, the enemy typically employs high-power radars, navigation beacons and identification friend or foe (IFF) equipment to detect penetrating aircraft and to aid and recognize its own aircraft. When the radar detects a penetrating aircraft, a radar operator interrogates it with an IFF signal to determine its identity. If the aircraft is friendly, it responds to the IFF interrogation with a transponded signal, usually on a different frequency than that of the interrogation. During this short time of response to interrogation, the friendly aircraft is an active emitter. The command and response sequence can be accurately timed to determine the range between the interrogator and the aircraft. If an unfriendly aircraft is detected, the radar operator vectors a fighter aircraft to intercept the penetrating aircraft.

In the setting described above, it is very desirable that the penetrating aircraft passively locate the enemy radar and interceptors in range and in azimuth without using the active sensors. To this end, the penetrating aircraft carries direction finding equipment such as an electronic support measure (ESM) system, for example. However, the direction finding equipment may be any type of SONAR or electromagnetic system which includes detection equipment suitable for detecting target emissions. The detection equipment may be located on any type of vehicle, including an aircraft, submarine or surface ship. Consequently, due to the generic applicability of the present invention, the vehicle carrying the detection system is hereinafter referred to as a platform.

Conventional electronic ranging and geolocation techniques do not fully utilize available information, and rely on signals originating from active search radars or bistatic returns provided by echoes from other targets in the vicinity. The techniques fall into roughly three categories.

The first category includes those that rely on long baselines and use either crossing of bearings or hyperbolic lines of position derived from time difference of arrival. These techniques require either multiple platforms or special tactics. An example of multiple platforms is a system with two receivers located in each wing tip of an aircraft, for example. This approach acquires theoretical information with which to compute the range to the emitter. An example of special tactics requires that a single platform fly along a baseline while taking measurements over a long time. Multiple platforms result in a more costly and complex system. Flying along a baseline requires that the emitter be stationary and preferably off to the side of the platform thus rendering the system less effective for emitters directly ahead of the platform. Furthermore, the process requires a relatively long time, and is inconsistent with adequate reactive maneuvers by the platform while under enemy attack. These disadvantages make it impractical for single platform penetration missions.

The second category includes techniques that employ bistatic ranging with prior knowledge of one or more of the sides of the triangle formed by the emitters and a receiver. This information, however, may not be available or current immediately prior to a mission. Likewise, it may not be sufficiently accurate in a dynamic engagement mission. This work is described in U.S. Pat. No. 4,370,656 to Frazer and Lewis.

The third category includes techniques that employ bistatic ranging along with determination of one or more of the angles of the triangle formed by the platform, an emitter and a secondary reflector. One such technique determines the angle between the range vectors from the platform to the emitter and from the platform to a reflecting target by directional measurements relative to the platform. A second approach determines the angle between the range vectors from the emitter to the platform and from the emitter to a secondary target. This is done by measuring the time delay as the main radar beam sweeps through the platform and the secondary target. The measurement is taken as the time delay between the passing of the main beam and the measurement of the main beam reflection from the secondary target. This technique requires knowledge of the scan time of a search radar. This technique is described in U.S. Pat. No. 4,670,757 to Munich and Schecker. Either technique has limited areas of application since modern radars may not scan in a regular pattern or with a constant scan speed.

Accordingly, it is an objective of the present invention to provide a method of range and azimuth determination that utilizes all available active emissions from other sources. Another objective of this invention is to provide a method for measuring range and heading information that utilizes only momentary emission from secondary sources such as enemy IFF transmissions. It is a further objective of the present invention to provide a method for measuring range and heading which utilizes the responsive nature of the IFF transmissions and utilizes known internal delays of IFF transmissions responsive to radar interrogation. Yet another objective of this invention is to provide a method for measuring range and heading which utilizes existing, fielded and operational, direction finding equipment and systems. A still further objective of the present invention is the provision of a method for measuring range and heading which operates both in a bistatic mode or transponded mode, depending on available signals to be exploited. Another objective of this invention is to provide a method for measuring range and heading which obtain solutions of target locations that is substantially instantaneous in time.

SUMMARY OF THE INVENTION

In view of the foregoing and other objectives and features, the present invention provides a method for location of multiple emitters that is entirely passive and that obtains location solutions that are substantially instantaneous in time. The method of the present invention utilizes the time difference of arrival of radar signals between direct paths and transponded or reflected paths and also the angles of arrival of the radar signals to determine range and azimuth. The method provides measurement of the angle at the platform between the path to a secondary target and the path to the emitter and the time delays of radar signals arriving via the different paths, and uses these values to calculate the location (range and azimuth) of both the radar and the target.

The measurements are taken twice. A first set of measurements considers signals originating at the radar emitter and measures the time difference of arrival of signals via a direct path from the emitter, and those arriving via the transponded or reflected path from a secondary target. A second set of measurements is concerned with the signals originating at the secondary target, such as IFF transmissions, and measures the time difference of arrival of signals via a direct path from the secondary target and those arriving after having been transponded by, or reflected from, the emitter. These measurements are then used to determine ranges and directional angles of the emitter and the secondary target relative to the platform.

The method of the present invention employs existing direction finding equipment, such as is found in electronic support measures ESM and radar warning in receivers (RWR) to measure the bearings of the targets and accurate timing of the time differences between the direct path signal from an emitting platform and that reflected or transponded by other platforms. The invention may be employed in bistatic or transponded mode, depending on the kind of signal emissions to be exploited. In the bistatic mode, the energy from an emitter is reflected from the other targets. In the transponder mode the targets communicate in an interrogation-transpond format with signals with known or small internal time delays. In the transponder mode both signals are direct path signals.

The method of the present invention may be applied to passively locate targets such as aircraft, missiles, helicopters, ships, spacecraft, or submarines from a single platform, and in a time interval comprising only a few pulses. The technique may be applied to electronic support measures (ESM), radar warning receivers, SONAR and navigation equipment. Passive ranging techniques have a major advantage in defense systems since the platform performing the ranging may remain completely covert. Passive ranging techniques may be employed for early warning, for cueing other sensors on the platform, including IR, optical, LASER and radar so that emissions may be eliminated or reduced to the minimum required to target weapons systems.

BRIEF DESCRIPTION OF THE DRAWINGS

The various features and advantages of the present invention may be more readily understood with reference to the following detailed description taken in conjunction with the accompanying drawings, wherein like reference numerals designate like elements, and in which.

DETAILED DESCRIPTION

Figure 1:
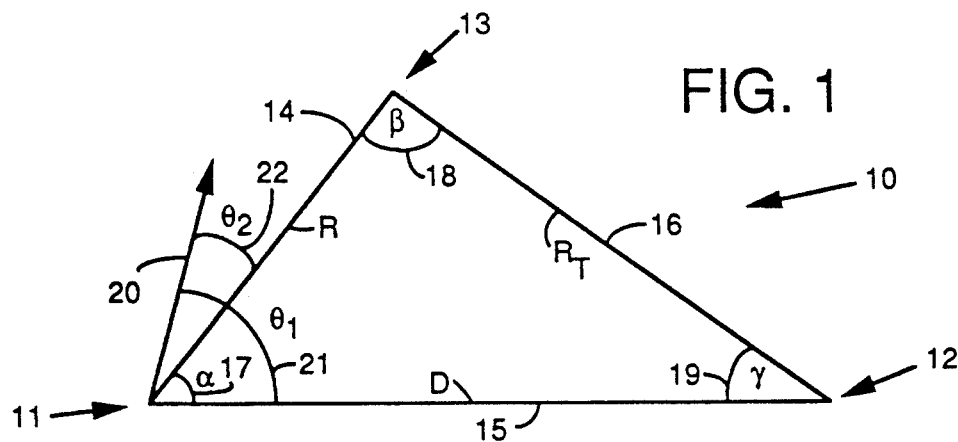
FIG. 1 is a diagrammatic plan view of the relative location of a measurement platform, an active radar emitter and a secondary target.

Referring now to FIG. 1 there is shown a representation of the geometric relationship 10 that forms the basis for the passive ranging and geolocation method that is the subject of the present invention. In FIG. 1 there is shown a platform 11, an emitter 12 and a secondary target 13 which form three corners of a triangle representing the geometric relationship 10 formed by the three objects. The platform 11 may be located on any type of vehicle, including an aircraft, satellite, submarine or surface ship, for example. The distances between the three corners represent relative ranges between the three objects, thus a platform-to-target range 14 is labeled R, a platform-to-emitter range 15 is labeled D and an emitter-to-target range 16 is labeled $R_T$. The platform-to-emitter range 15 and the platform-to-target range 14 subtend a platform angle 17 that is labeled $\alpha$. Similarly, the platform-to-target range 14 and the emitter-to-target range 16 subtend a target angle 18 that is labeled $\beta$, and the platform-to-emitter range 15 and the emitter-to-target range 16 subtend an emitter angle 19 that is labeled $\gamma$. A platform reference 20 denotes the general orientation of the platform 11 and serves as the reference for the measurements of an emitter heading 21, labelled $\theta_1$, and a target heading 22, labelled $\theta_2$. The labels are symbolic representations of the variables for use in subsequently described algorithms.

In operation, the platform 11 may be any craft, such as an aircraft, ship, spacecraft, or land vehicle that is free to generally move relative to other objects, or it may be a fixed intercept station. Typically, however, the platform 11 is mounted on an intruding aircraft trying to penetrate enemy defensive systems. The platform 11 may carry with it any type of receivers which can detect electromagnetic or SONAR emissions from other platforms. The receivers may also include direction finding equipment typically, but not necessarily, of the type associated with an electronic support measure (ESM) system.

The emitter 12 may be the emitter element of a surveillance system, and may be mobile or fixed, and may be radiating electromechanical energy or acoustical energy. The emitter 12 typically illuminates intruding objects to determine the position and speed of the object. Additionally, the emitter 12 interrogates the object with IFF signals to determine whether the intruding object is a friend or an undesirable intruder.

The secondary target 13, in order to be useful to the present system and method, is generally a friendly object relative to the emitter 12. As such, it will generally respond to the interrogations with IFF transmissions. During this response, the secondary target 13 emits an active signal in response to the interrogation of the emitter 12 and will itself, for a short time, be an active emitter whose emanations may be intercepted by the intruder, or platform 11.

The totality of emissions, echoes, interrogations and responses emanating from emitter 12 and secondary target 13 constitute two distinct emission sequences. A first emission sequence is initiated by the interrogation by the emitter 12 and is followed by an answering active emission by, or passive reflection from, the secondary target 13. A second emission sequence is initiated by the answering active emission by the secondary target 13. An example is provided by a response to the emitter query with a signal for the purpose of ranging or IFF back to the emitter 12. The second emission sequence is completed by an active response by, or passive return from, the emitter 12.

The receiver on platform 11 generally monitors these emissions. However, according to this invention, the platform 11 focuses on the emission sequences and specifically measures the time difference in arrival of two signals constituting one emission sequence. The first emission sequence starts with a first interrogation signal by the emitter 12 that arrives at the platform 11 as a first received signal. The first received signal arrives after having travelled the direct path D shown in FIG. 1. A timer is started upon detection of this signal. The second received signal arriving at the platform 11 also originated at the emitter 12 and is the first interrogation signal by the emitter 12 reflected off the primary target 13 or its transponder direct signal with its internal delay. This signal then has traveled the indirect path, $(R_T+R)$, as shown in FIG. 1. The timer is now stopped, thus marking a time difference in arrival of the two signals. This time difference, labeled $\tau_1$, when combined with a known velocity of propagation of the signals, labeled c, form the basis for one algebraic equation relating the path differences shown in FIG. 1. Similarly, the second emission sequence starts with an active signal originated by the primary target 13 as an interrogation of the secondary target 13 or as an independent IFF interrogation. The first received signal of the second emission sequence arrives at the platform 11 after having traveled the distance R as shown in FIG. 1. A timer is generally started upon detection of this signal. The second received signal of the second emission sequence arriving at the platform 11 also originated at the secondary target 13. However, this signal have traveled the indirect path, $(R_T+D)$, as shown in FIG. 1. The timer is now generally stopped, thus marking a time difference in arrival of the two signals. This time difference, labeled $\tau_2$, when combined with a known velocity of propagation of the signals, labeled c, form the basis for a second algebraic equation relating the path differences shown in FIG. 1.

The second received signal, or echo, of the two emission sequences may also have originated from active emissions provided that they are sent in response to an interrogating signal and that the internal time for the response is known prior to the engagement. Thus, for the first emission sequence, an answering active response by the secondary target 13 may be used to measure the time difference in travel time. In this case, however, the true difference in path travel time is the time difference of the received signals minus the known response time of the secondary target 13. In the case of the second emission sequence the second received signal may be the active response of the emitter 13 to IFF interrogations by the primary target 12.

Similarly, the composition of the signals in any given emission sequence may be any combination of identified signals provided that their place in a emission sequence are identified. The time differences $\tau_1$ and $\tau_2$ of the received signals are linked symbolically by the formulas:

$$c\tau_1 = R + R_T - D \quad (1)$$

$$c\tau_2 = R + R_T + D \quad (2)$$

where c is the velocity of propagation of the signal.

The platform angle 17, $\alpha$, is readily determined from the bearing measurements with respect to some arbitrary reference direction, such as north, magnetic north or platform relative. Thus $$\alpha = \theta_1 - \theta_2 \quad (3)$$

From the measurements of the differential path lengths one can immediately determine the emitter-to-target range 16 by:

$$R_T = c(\tau_1 + \tau_2) \div 2 \quad (4)$$

Then from the law of cosines we can calculate the platform-to-target range 14 by:

$$R = \left(\frac{c}{4}\right)[\tau_1 - \tau_2 \pm \sqrt{(\tau_1 - \tau_2)^2 + 8\tau_1\tau_2(1 - \cos\alpha)}] \quad (5)$$

where the positive root of the radical is used. Then it is evident from the first equations that:

$$D = R + R_T - c\tau_2 \quad (6)$$
$$= c\tau_2 + R + R_T \quad (7)$$

The angle 18 and the angle 19, symbolically $\beta$ and $\gamma$, are then readily computed via the law of sines:

$$\gamma = \sin^{-1}\left[\frac{R \sin \alpha}{R_T}\right] \quad (8)$$

and $$\beta = \sin^{-1}\left[\frac{D \sin \alpha}{R_T}\right] \quad (9)$$

to complete the set of equations for the unknown parameters. A solution of available for the symbolic angle, $\alpha$, and the ranges of the triangle of FIG. 1 after measuring the two time differences, $\tau_1$ and $\tau_2$, and the symbolic angles $\theta_1$ and $\theta_2$.

Figure 2:
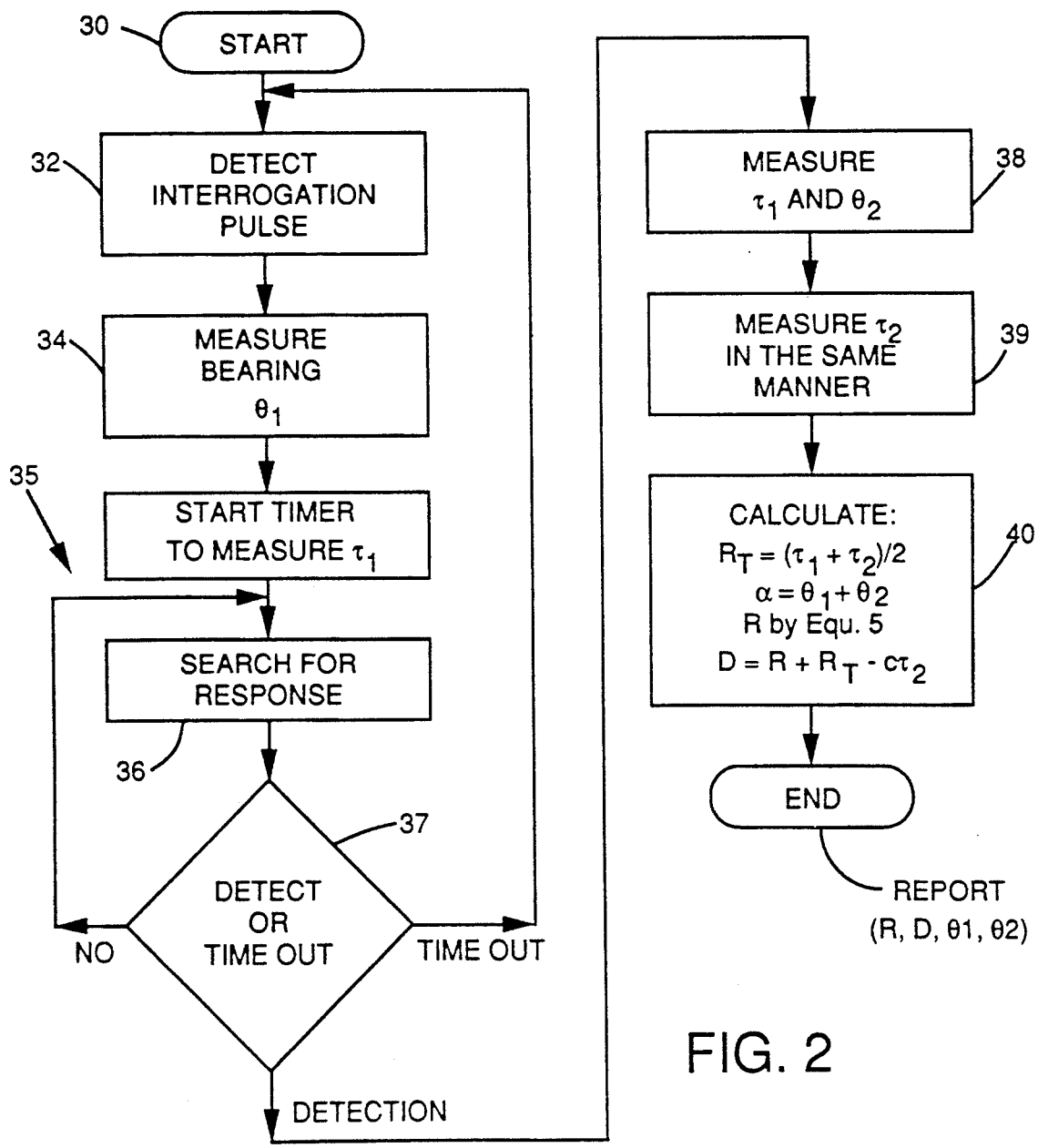
FIG. 2 is a a computer flow diagram illustrating the steps of the invention.

Referring now to FIG. 2 there is shown a graphic representation of an events sequence 30 illustrating the sequential steps of the method of the present invention. A start event 31 represents the beginning of a search sequence. An interrogation detection event 32, a first measuring event 33 and a timer event 34 follows in the event sequence. A first emission event 35, comprising a search event 36 and a detection event 37, follows and is in turn followed by a second measuring event 38. A second emission event 39, which is a duplicate of the first emission event 35, follows from the second emission sequence. The last event in the sequence of FIG. 2 is a computation event 40 for calculating desired variables based on previously measured variables.

In operation, the events sequence 30 is initiated by an interrogation signal from the emitter 12 of FIG. 1. This marks a series of steps taken during the first emission sequence. As soon as the interrogation signal is detected by the interrogation detection event 32, the first measuring event 33 obtains a measure of the symbolic bearing angle $\theta_1$ of the emitter 12 relative to the platform 11 as shown in FIG. 1. Simultaneously the timer event 34 starts a timer for measurement of the time difference $\tau_1$ and also initiates the first emission event 35.

The first emission event 35 maintains the search event 36 which initiates a receiver search for a response, or an echo, of the interrogation signal. The arrival of the interrogation signal initiates the detection event 37 which interrupts the first emission event 35 and initiates the second measuring event 38. The event 38 marks the measuring of the symbolic bearing angle $\theta_2$ of the secondary target 13 relative to the platform 11 as shown in FIG. 1. The second measuring event 38 also marks the stopping of the timer to obtain the time difference $\tau_1$ representing the different arrival time of signals traveling the direct and indirect paths. The second emission event 39 repeats the steps taken throughout the first emission sequence.

The steps thus provide for restarting the timer for the second emission sequence and thus preparing to measure the time difference $\tau_2$ denoting the difference in arrival time by signals having traveled a direct and indirect path. The steps continue by searching, waiting for and then detecting the answering signal and finally obtain a measurement of the time difference $\tau_2$. The computation event 40 represents computer algorithms which solve for selected variables according to equations (1) through (8) above. Thus symbolic representations of angles and ranges as shown in FIG. 1 are obtained.

Referring to equations (1) through (8) above, to the events sequence 30 of FIG. 2 and to the representations of angles and ranges shown in FIG. 1, there is shown sufficient equations relating the variables depicted in FIG. 1, as well as measurements of pertinent variables, to solve for the unmeasured, and hence unknown, variables. The measurements and computer algebraic computations are an inherent part of a computer program. The angles and ranges depicted in FIG. 1 are therefor solved substantially instantaneously. There is thus no need for any fly out maneuver, base leg establishments or of prior knowledge of emitter location before accurate estimates are available for ranges to enemy crafts or installations. This is of utmost importance in a combat environment.

Thus there has been described a new and improved method for single platform passive ranging and geolocation of multiple emitters by employing time difference of arrival between the direct paths and the transponded or reflected paths and the angles of arrival to determine range and azimuth. The method may be used on any platform having direction finding equipment. The platform may be installed in a moving object, such as an aircraft, on stationary objects or on a combination of moving and stationary objects. The method may be used to locate a number of emitting targets in either a bistatic or interrogator/transponder mode.

It is to be understood that the above-described steps of the overall method of this invention are merely illustrative of some of the many specific steps which represent applications of the principles of the present invention. Clearly, numerous and other arrangements can be readily devised by those skilled in the art without departing from the scope of the invention.

What is claimed is:

1. A method of passive ranging and geolocation based on signal emanations from an emitter and from an object, said method comprising the steps of:
   measuring a first time of arrival difference ($\tau_1$) of an active ranging and interrogation signal from an emitter and the passive return of a reflected signal from an object illuminated and interrogated by the emitter;
   measuring a second time of arrival difference ($\tau_2$) of an active answering signal from the object that is responsive to the emitter interrogation and a passive return of the answering signal that is reflected from the emitter;
   measuring the respective bearings ($\theta_1$, $\theta_2$) of the arriving signals;
   computing a platform angle ($\alpha$) between the emitter and the object in accordance with a first predefined relationship;
   computing a relative range ($R_T$) between the emitter and the object in accordance with a second predefined relationship;
   computing a first range (R) from the platform to the emitter in accordance with a third predefined relationship; and
   computing a second range (D) from the platform to the object in accordance with a fourth predefined relationship.

2. The passive ranging and geolocation method of claim 1 wherein the first predefined relationship in the step of computing a platform angle ($\alpha$) comprises the equation $\alpha = \theta_1 - \theta_2$.

3. The passive ranging and geolocation method of claim 2 wherein the second predefined relationship in the step of computing a relative range ($R_T$) comprises the equation $R_T = c(\tau_1 + \tau_2) \div 2$.

4. The passive ranging and geolocation method of claim 3 wherein the third predefined relationship in the step of computing a second range (D) comprises the equation $D = R + R_T - c\tau_2 = c\tau_2 + R + R_T$.

5. The passive ranging and geolocation method of claim 4 wherein the fourth predefined relationship in the step of computing a first range (R) comprises the equation $$R = \left(\frac{c}{4}\right)[\tau_1 - \tau_2 \pm \sqrt{(\tau_1 - \tau_2)^2 + 8\tau_1\tau_2(1 - \cos\alpha)}\,]$$

6. The passive ranging and geolocation method of claim 1 wherein the signal emanations from an emitter and from the object comprise emanations of electromagnetic signals.

7. The passive ranging and geolocation method of claim 1 wherein the signal emanations from an emitter (12) and from an object (13) comprise emanations of acoustic signals.

8. The passive ranging and geolocation method of claim 1 wherein the step of measuring the first time of arrival difference ($\tau_1$) comprise the steps of:
   detecting the active interrogation signal from the emitter;
   starting a reference timer;
   detecting an active reply signal from the answering object that is responsive to the interrogation signal and recording the time of detection;
   computing a first time delay ($\tau_1$) between the first interrogation signal and the first reply signal in accordance with a first predefined relationship.

9. The passive ranging and geolocation method of claim 1 wherein the step of measuring the second time of arrival difference ($\tau_2$) comprises the steps of:
   detecting an active second interrogation signal from the emitter that is responsive to the first reply signal and stopping the reference timer; and
   computing the second time delay ($\tau_1$) between the first reply signal and the second interrogation signal in accordance with a second predefined relationship.

10. A method of passive ranging and geolocation of a emitter that interrogates an object, which object is actively responsive to the interrogation of the emitter, and wherein the internal response times of the emitter and the object are known, said method comprising the steps of:
    detecting an active first interrogation signal from the emitter;
    starting a reference timer;
    measuring a first bearing ($\theta_1$) to the emitter;

detecting an active first reply signal from an answering object that is responsive to the first interrogation signal and recording the time of detection;

computing a first time delay ($\tau_1$) between the first interrogation signal and the first reply signal;

measuring a second bearing ($\theta_2$) to the answering object;

detecting an active second interrogation signal from the emitter that is responsive to the first reply signal and stopping the reference timer;

computing a second time delay ($\tau_2$) between the active first reply signal and the second interrogation signal;

computing a platform angle ($\alpha$) between the emitter and the answering object;

computing a relative range ($R_T$) between the emitter and the answering object;

computing a first range (R) to the emitter; and computing a second range (D) to the answering object.

11. The passive ranging and geolocation method of claim 10 wherein the first predefined relationship in the step of computing a platform angle ($\alpha$) comprises the equation $\alpha = \theta_1 - \theta_2$.

12. The passive ranging and geolocation method of claim 11 wherein the second predefined relationship in the step of computing a relative range ($R_T$) comprises the equation $R_T = c(\tau_1 + \tau_2) \div 2$.

13. The passive ranging and geolocation method of claim 12 wherein the third predefined relationship in the step of computing a second range (D) comprises the equation $D = R + R_T - c\tau_2 = c\tau_2 + R + R_T$.

14. The passive ranging and geolocation method of claim 13 wherein the fourth predefined relationship in the step of computing a first range (R) comprises the equation $$R = \left(\frac{c}{4}\right)[\tau_1 - \tau_2 \pm \sqrt{(\tau_1 - \tau_2)^2 + 8\tau_1\tau_2(1 - \cos\alpha)}\,]$$

15. A method of passive ranging and geolocation based on signal emanations from multiple objects, said method comprising the steps of:

detecting an interrogation signal from a first object;

starting a reference timer;

measuring a first bearing ($\theta_1$) to the first object;

searching for a first echo signal that is the interrogation signal reflected from a second object;

detecting the first echo signal and stopping the reference timer;

measuring a first time delay ($\tau_1$) between the interrogation signal and the first echo signal;

measuring a second bearing ($\theta_2$) to the second object;

detecting an active reply signal from the second object;

re-starting the reference timer;

searching for a second echo signal that is the active reply signal of the second object reflected from the first object;

detecting the second echo signal and stopping the reference timer;

measuring a second time delay ($\tau_2$) between the active reply signal and the second echo signal;

computing a platform angle ($\alpha$) between the first object and the second object in accordance with a first predefined relationship;

computing a relative range ($R_T$) between the first object and the second object in accordance with a second predefined relationship;

computing a second range (D) to the second object in accordance with a third predefined relationship; and computing a first range (R) to the first object in accordance with a fourth predefined relationship.

16. The passive ranging and geolocation method of claim 15 wherein the first predefined relationship in the step of computing a platform angle ($\alpha$) comprises the equation $\alpha = \theta_1 - \theta_2$.

17. The passive ranging and geolocation method of claim 16 wherein the second predefined relationship in the step of computing a relative range ($R_T$) comprises the equation $R_T = c(\tau_1 + \tau_2) \div 2$.

18. The passive ranging and geolocation method of claim 17 wherein the third predefined relationship in the step of computing a second range (D) comprises the equation $D = R + R_T - c\tau_2 = c\tau_2 + R + R_T$.

19. The passive ranging and geolocation method of claim 18 wherein the fourth predefined relationship in the step of computing a first range (R) comprises the equation $$R = \left(\frac{c}{4}\right)[\tau_1 - \tau_2 \pm \sqrt{(\tau_1 - \tau_2)^2 + 8\tau_1\tau_2(1 - \cos\alpha)}\,]$$

* * * * *